(12) United States Patent
Iwasaki

(10) Patent No.: US 8,854,532 B2
(45) Date of Patent: Oct. 7, 2014

(54) IMAGING APPARATUS, IMAGING METHOD, AND PROGRAM

(75) Inventor: Masanori Iwasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 13/183,636

(22) Filed: Jul. 15, 2011

(65) Prior Publication Data

US 2012/0050580 A1 Mar. 1, 2012

(30) Foreign Application Priority Data

Aug. 26, 2010 (JP) ................. 2010-189302

(51) Int. Cl.
*H04N 5/232* (2006.01)
*G03B 13/00* (2006.01)

(52) U.S. Cl.
CPC .................. *H04N 5/23212* (2013.01)
USPC .......................... 348/348; 348/350

(58) Field of Classification Search
USPC ................... 348/348, 350
See application file for complete search history.

(56) References Cited

U.S. PATENT DOCUMENTS

| | | | |
|---|---|---|---|
| 2008/0259170 A1* | 10/2008 | Hatanaka ............... | 348/208.6 |
| 2009/0147999 A1* | 6/2009 | Maeda et al. ............ | 382/106 |
| 2010/0103311 A1* | 4/2010 | Makii ..................... | 348/369 |
| 2011/0043666 A1* | 2/2011 | Mitsumoto .............. | 348/241 |
| 2011/0058097 A1* | 3/2011 | Mizuo .................... | 348/350 |
| 2012/0105823 A1* | 5/2012 | Hardegger et al. ...... | 356/5.01 |

FOREIGN PATENT DOCUMENTS

JP 6-122847 5/1994

* cited by examiner

*Primary Examiner* — Tuan Ho
*Assistant Examiner* — Shahbaz Nazrul
(74) *Attorney, Agent, or Firm* — Sony Corporation

(57) ABSTRACT

An imaging apparatus includes: an optical system that forms an image corresponding to subject light incident through a lens; an imaging device that produces a signal corresponding to the subject light incident through the lens and outputs the signal as a captured image; acquisition means for acquiring the distance to the subject; and correction means for correcting blur in the captured image outputted from the imaging device based on an imaging characteristic of the optical system specific to the subject distance acquired by the acquisition means.

20 Claims, 11 Drawing Sheets

FIG.2

IMAGING APPARATUS, IMAGING METHOD, AND PROGRAM

FIELD

The present disclosure relates to an imaging apparatus, an imaging method, and a program, and particularly to an imaging apparatus, an imaging method, and a program that allow a focused image to be produced with a reduced amount of computation.

BACKGROUND

When a digital still camera or any other similar imaging apparatus is used to capture an image, a user typically performs predetermined operation to bring a desired subject into focus. Specifically, the user aims the digital still camera at the desired subject in such a way that the subject is positioned at the center of a finder and then presses a shutter button halfway to bring the subject into focus.

In general, the focusing operation in a digital still camera is performed by using a contrast method to determine the position of a lens where the contrast of a subject image is maximized and moving the lens to the thus determined lens position. The focusing operation described above is what is called autofocusing. Alternatively a subject image can be brought into focus by using a range finder based on an optical distance meter to superimpose images produced by using light fluxes traveling along two different optical paths.

Still alternatively, there is a technique in which a user selects a predetermined subject in a realtime image (what is called a through image) displayed in an electronic view finder (EVF) having a touch panel function and the camera (automatically) measures the distance to a region containing the selected subject and brings the subject into focus (see JP-A-8-122847, for example).

SUMMARY

Before an image of the subject having automatically been brought into focus as described above is captured, however, the distance to the subject may abruptly change or the autofocusing may not have been performed very precisely. In this case, the resultant captured image is not a focused image or a defocused image.

To address the problem, it is conceivable to perform predetermined signal processing on such a defocused image so that the blur is corrected and a focused image is produced. Specifically, a blur function representing the amount of blur in a defocused image is estimated, and inverse computation using an inverse function of the estimated blur function is performed on the defocused image based on a lens imaging characteristic specific to the distance to the subject (subject distance). A focused image can thus be produced without autofocusing operation.

However, since the distance to the subject contained in the defocused image is not known, it is necessary to perform the signal processing on the defocused image based on the lens imaging characteristics specific to every possible subject distance. In this case, the amount of computation is enormous.

Thus, it is desirable to produce a focused image with a reduced amount of computation.

An imaging apparatus according to one embodiment of the present disclosure includes an optical system that forms an image corresponding to subject light incident through a lens, an imaging device that produces a signal corresponding to the subject light incident through the lens and outputs the signal as a captured image, acquisition means for acquiring the distance to the subject, and correction means for correcting blur in the captured image outputted from the imaging device based on an imaging characteristic of the optical system specific to the subject distance acquired by the acquisition means.

The imaging apparatus may further includes display means for displaying the captured image and selection means for selecting based on user's operation the subject in the captured image displayed on the display means. The correction means may correct blur in the captured image based on the imaging characteristic of the optical system specific to the distance to the subject selected by the selection means based on the subject distance acquired by the acquisition means.

The display means may display through images, which are images captured in realtime, produced by instructing the imaging device to perform pixel value addition or thinning reading. The selection means may select the subject in one of the through images based on user's operation. The acquisition means may acquire the distance to the subject when the selection means selects the subject in the through image. The correction means may correct blur in the captured image based on the imaging characteristic of the optical system specific to the distance to the subject selected in the through image by the selection means based on the subject distance acquired by the acquisition means.

The imaging apparatus may further include producing means for producing a focused through image from the through image, the focused through image so produced that the subject selected in the through image by the selection means is brought into focus. The display means may display the focused through image produced by the producing means.

The imaging device may output part of the signal corresponding to the subject light incident through the lens, the part of the signal used as distance information on the distance to the subject. The acquisition means may acquire the distance to the subject based on the distance information outputted from the imaging device.

The lens may be a single focal length lens that brings an object at infinity or a remote distance into focus.

The lens may be a zoom lens, and the correction means may correct blur in the captured image based on an imaging characteristic of the optical system that has been obtained in advance and is specific not only to the subject distance acquired by the acquisition means but also to a zooming state of the zoom lens.

The correction means may correct blur in the captured image based on a point spread function of the optical system specific to the subject distance acquired by the acquisition means.

The correction means may correct blur in the captured image based on a line spread function of the optical system specific to the subject distance acquired by the acquisition means.

The correction means may correct blur in the captured image based on an optical transfer function of the optical system specific to the subject distance acquired by the acquisition means.

An imaging method according to one embodiment of the present disclosure is used with an imaging apparatus including an optical system that forms an image corresponding to subject light incident through a lens, an imaging device that produces a signal corresponding to the subject light incident through the lens and outputs the signal as a captured image, acquisition means for acquiring the distance to the subject, and correction means for correcting blur in the captured image outputted from the imaging device based on an imaging characteristic of the optical system specific to the subject distance acquired by the acquisition means. The method includes acquiring the distance to the subject by using the acquisition means and correcting blur by using the correction means in the captured image outputted from the imaging device based on the imaging characteristic of the optical system specific to the subject distance acquired in the acquiring.

A program according to one embodiment of the present disclosure instructs a computer to carry out an imaging process in an imaging apparatus including an optical system that forms an image corresponding to subject light incident through a lens and an imaging device that produces a signal corresponding to the subject light incident through the lens and outputs the signal as a captured image. The program instructs the computer to execute an acquisition control step of controlling acquisition of the distance to the subject and a correction step of correcting blur in the captured image outputted from the imaging device based on an imaging characteristic of the optical system specific to the subject distance acquired in the acquisition control step.

In another embodiment of the present disclosure, the distance to a subject is acquired, and blur in a captured image outputted from an imaging device is corrected based on an imaging characteristic of an optical system specific to the acquired distance to the subject.

In any of the embodiments of the present disclosure, a focused image can be produced with a reduced amount of computation.

BRIEF DESCRIPTION OF THE DRAWINGS

FIG. 2 describes the arrangement of pixels that form a distance measuring image sensor;

DETAILED DESCRIPTION

Embodiments of the present disclosure will be described below with reference to the drawings. The description will be made in the following order.

1. First Embodiment (configuration in which a single focal length lens is provided and an image is captured in response to shuttering operation)

2. Second Embodiment (configuration in which a single focal length lens is provided and an image is captured in response to touching operation)

3. Third Embodiment (configuration in which a zoom lens is provided and an image is captured in response to shuttering operation)

<1. First Embodiment>
[Configuration of imaging apparatus]

Figure 1:
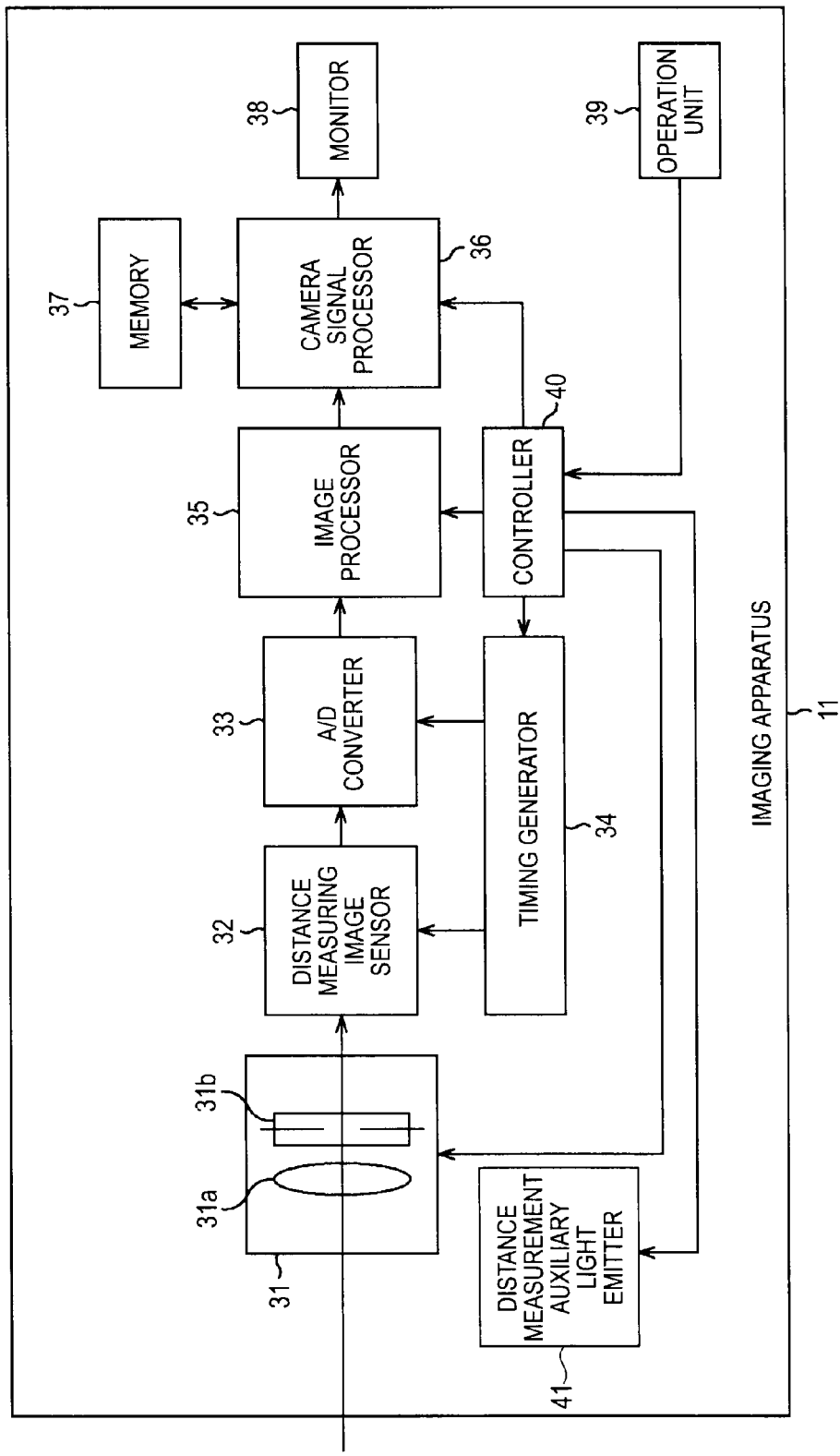
FIG. 1 is a block diagram showing the configuration of an embodiment of an imaging apparatus to which the present disclosure is applied.

FIG. 1 shows the configuration of an embodiment of an imaging apparatus to which the present disclosure is applied.

An imaging apparatus 11 shown in FIG. 1 is configured, for example, as a digital still camera and captures an image of a subject, stores the captured image of the subject (stationary image), and presents the captured image to a user in accordance with user's operation.

The imaging apparatus 11 operates, for example, at least under the following operation modes: an imaging mode in which an image of a subject is captured and the captured image is recorded and an image viewing mode in which the user can view a recorded captured image. The imaging apparatus 11, when the user operates it and selects the imaging mode, captures an image of a subject in response to user's shuttering operation and records the captured image. The imaging apparatus 11, when the user operates it and selects the image viewing mode, allows the user to select a desired captured image from recorded captured images and displays the selected captured image.

The imaging apparatus 11 shown in FIG. 1 includes an optical system 31, a distance measuring image sensor 32, an A/D (analog to digital) converter 33, a timing generator 34, an image processor 35, a camera signal processor 36, a memory 37, a monitor 38, an operation unit 39, a controller 40, and a distance measurement auxiliary light emitter 41.

The optical system 31 supplies an image of a subject to the distance measuring image sensor 32, where the image is captured.

The optical system 31, which includes a lens 31a and an aperture 31b, adjusts the amount of light from the subject incident through the lens 31a and allows the resultant light to be incident on the distance measuring image sensor 32.

The optical system 31 does not need to adjust the position where the image corresponding to the light from the subject incident through the lens 31a is formed. That is, the lens 31a is a monocular lens designed to have a single focal length and bring a remote point (far object) located 2 meters, 4 meters, or other distances away from the lens 31a or even a point at infinity into focus. The aperture 31b adjusts the amount of light incident through the lens 31a on the distance measuring image sensor 32.

The distance measuring image sensor 32, which is a CCD (charge coupled device) sensor, a CMOS (complementary metal oxide semiconductor) sensor, or any other suitable sensor, captures the image of the subject and outputs the resultant image signal.

That is, the distance measuring image sensor 32 receives the light incident through the optical system 31, converts the light into an image signal (analog signal) in the form of electric signal according to the amount of received light in a photoelectric conversion process, and supplies the image signal to the A/D converter 33.

The distance measuring image sensor 32 further supplies the A/D converter 33 with part of the signal corresponding to the light from the subject incident through the lens 31a as distance information (analog signal) representing the distance between the imaging apparatus 11 and the subject.

The arrangement of pixels that form the distance measuring image sensor 32 will now be described with reference to FIG. 2.

A typical image sensor employs what is called a Bayer layout, in which colors R (red), G (green), and B (blue) are so assigned to the pixels that the G pixels are arranged in a checkerboard pattern and the R and B pixels are disposed between the G pixels.

Figure 2:
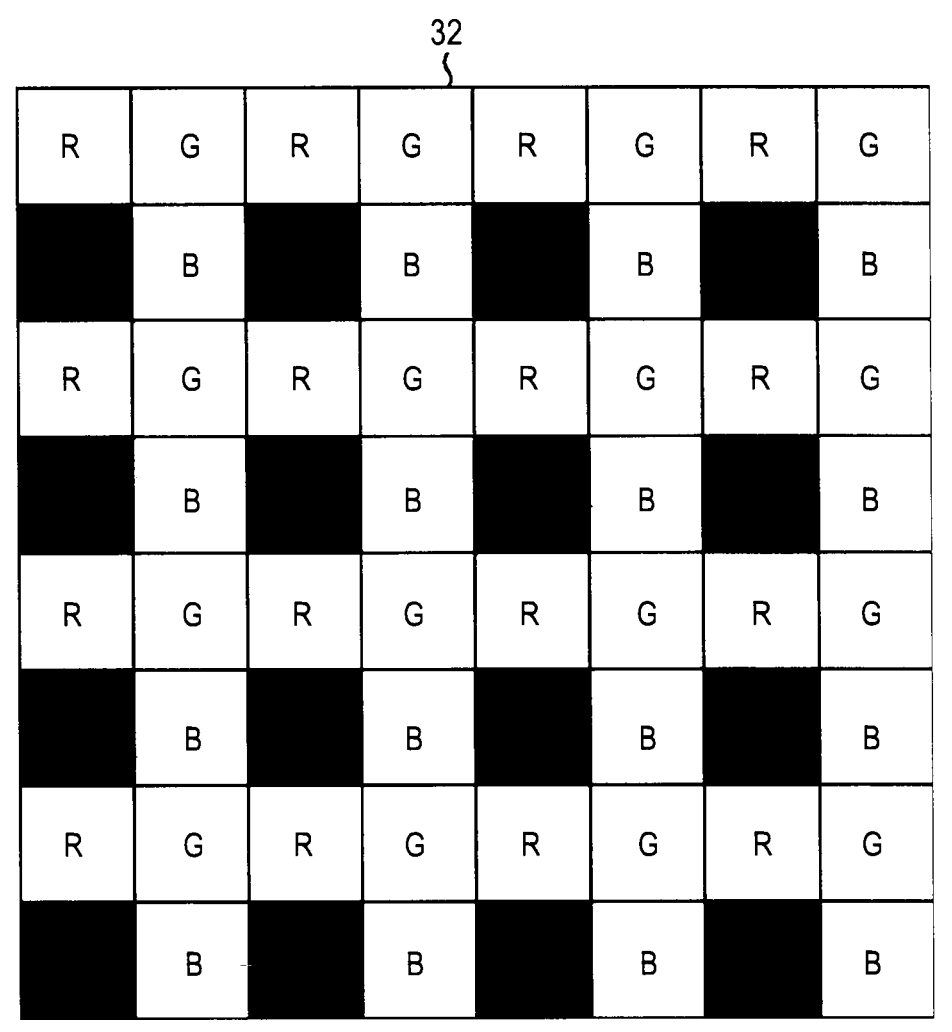

The distance measuring image sensor 32 shown in FIG. 2 is so configured that one-half the G pixels arranged in a checkerboard pattern as in a typical image sensor (G pixel of each set of 2×2 (=4) adjacent RGBG pixels) are used as pixels for distance measurement (painted in black in FIG. 2).

The distance measuring image sensor 32 receives light projected from the distance measurement auxiliary light emitter 41, which will be described later, to a subject, reflected off the subject, and incident on the pixels for distance measurement. The distance measuring image sensor 32 determines the distance to the subject based on the period from the projection of the light to the reception thereof by using what is called a TOF (time of flight) method and outputs distance information representing the distance to the subject.

That is, the distance measuring image sensor 32 can output not only an image signal produced by the RGB pixels for imaging but also distance information produced by the pixels for distance measurement.

In the distance measuring image sensor 32 shown in FIG. 2, in which one out of four pixels is used as a distance measurement pixel, the ratio of the distance measurement pixels to the entire RGB pixels is arbitrarily set, for example, one to sixteen pixels. Further, the distance measuring image sensor 32, which is a single (single-panel) sensor formed of RGB pixels and distance measurement pixels (that is, the pixels are integrated into one chip), may alternatively be formed of two sensors, an image sensor that employs the Bayer layout described above and a distance measuring sensor all the pixels of which are used for distance measurement. In this case, one pixel in the distance measuring sensor only needs to correspond to one pixel, four pixels, or any other number of pixels in the image sensor. In other words, the number of pixels (pixel arrangement) in the distance measuring sensor does not necessarily equal to the number of pixels (pixel arrangement) in the image sensor. Still alternatively, the distance measuring image sensor 32 may be a three-panel sensor. Specifically, in at least one of the RGB image sensors, one out of 2×2 (=4) adjacent pixels, for example, may be used as a distance measurement pixel.

The description of the configuration of the imaging apparatus 11 will be made again by referring back to FIG. 1. The A/D converter 33 converts the analog signal supplied from the distance measuring image sensor 32 (image signal and distance information) into a digital signal and supplies the digital signal to the image processor 35.

For example, when the distance measuring image sensor 32 is a CCD sensor, the timing generator 34 generates a timing signal for driving the CCD under the control of the controller 40 and supplies the timing signal to the distance measuring image sensor 32 and the A/D converter 33.

The image processor 35 performs predetermined image processing on the digital signal (image signal) from the A/D converter 33 under the control of the controller 40 and supplies the processed signal to the camera signal processor 36.

The camera signal processor 36 performs a variety of processes on the image signal from the image processor 35, such as color correction, white balance adjustment, grayscale conversion, gamma correction, YC conversion, and compression, records the processed signal in the memory, and displays it on the monitor 38.

The operation unit 39 is formed of buttons, dials, levers, a touch panel laminated on the monitor 38, and other components and receives user's operational inputs.

The controller 40 controls the components in the imaging apparatus 11 based on a signal representing a user's operational input.

The distance measurement auxiliary light emitter 41 emits light to a subject, which reflects the light to be received by the distance measurement pixels in the distance measuring image sensor 32, which has been described with reference to FIG. 2.

[Exemplary functional configuration of imaging apparatus]

An exemplary functional configuration of the imaging apparatus 11 shown in FIG. 1 will next be described with reference to FIG. 3.

Figure 3:
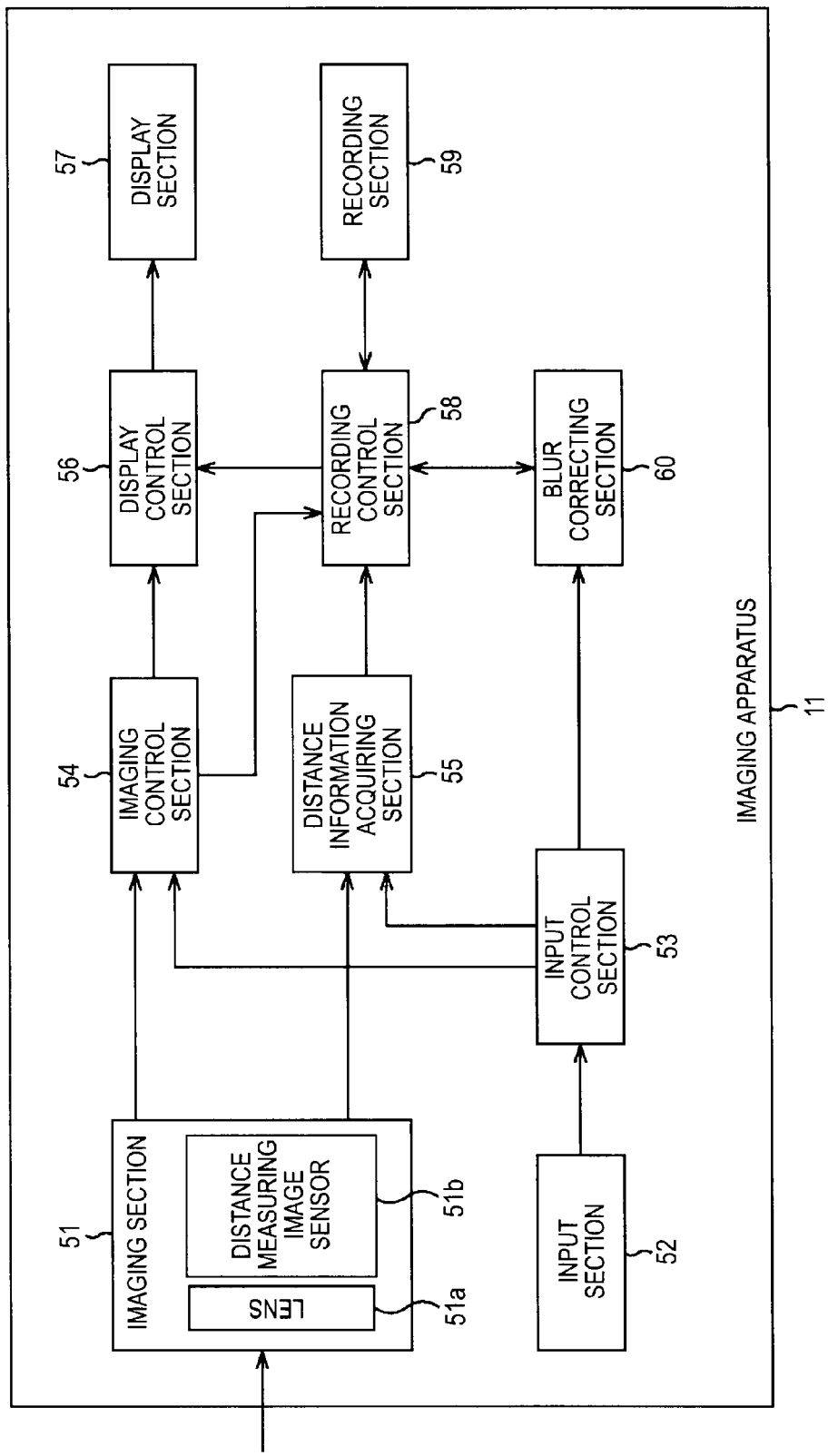
FIG. 3 is a block diagram showing an exemplary functional configuration of the imaging apparatus.

The imaging apparatus 11 shown in FIG. 3 includes an imaging section 51, an input section 52, an input control section 53, an imaging control section 54, a distance information acquiring section 55, a display control section 56, a display section 57, a recording control section 58, a recording section 59, and a blur correcting section 60.

The imaging section 51 includes a lens 51a and a distance measuring image sensor 51b. The lens 51a and the distance measuring image sensor 51b are the same as the lens 31a and the distance measuring image sensor 32 shown in FIG. 1, and no detailed description of the lens 51a and the distance measuring image sensor 51b will therefore be made. Subject light that enters the lens 51a is focused on the distance measuring image sensor 51b, and the imaging section 51 supplies not only an image signal carrying the formed subject image to the imaging control section 54 but also distance information on the distance to the subject, which has been imaged, to the distance information acquiring section 55.

The input section 52, which corresponds to the operation unit 39 shown in FIG. 1, receives an input from the operation unit 39 when the user operates it and supplies a signal representing the input corresponding to the user's operation (operation signal) to the input control section 53.

The input control section 53 supplies an instruction corresponding to the operation signal from the input section to the imaging control section 54 and the distance information acquiring section 55.

The imaging control section 54 produces an image signal carrying a display image to be displayed on the display section 57 based on the image signal from the imaging section 51 and supplies the produced image signal to the display control section 56. The imaging control section 54 further acquires the image signal from the imaging section 51 and supplies the acquired image signal to the recording control section 58 in accordance with the instruction from the input control section 53.

The distance information acquiring section 55 acquires the distance information from the imaging section 51 and supplies the distance information to the recording control section 58 in accordance with the instruction from the input control section 53.

The display control section 56 displays the display image on the display section 57 based on the image signal carrying the display image from the imaging control section 54. The display control section 56 alternatively displays an image carried by an image signal supplied (read) from the recording section 59 via the recording control section 58 on the display section 57.

The display section 57, which corresponds to the monitor 38 shown in FIG. 1, displays an image under the control of the display control section 56.

The recording control section 58 relates the image signal from the imaging control section 54 to the distance information from the distance information acquiring section 55 on the basis of pixels in the distance measuring image sensor 51b (on the basis of four adjacent pixels, for example) and records the image signal and the distance information related to each other in the recording section 59. The recording control section 58 alternatively reads an image signal and distance information recorded in the recording section 59 and supplies them to the display control section 56 and the blur correcting section 60 as necessary.

The recording section 59, which corresponds to the memory 37 shown in FIG. 1, records the image signal and distance information from the recording control section 58. The recording control section 58 reads the image signal and distance information recorded in the recording section 59 as necessary.

The blur correcting section 60 corrects blur contained in the captured image carried by the image signal from the recording control section 58 and supplies the corrected captured image to the recording control section 58 in accordance with an instruction from the input control section 53. The blur-corrected captured image supplied to the recording control section 58 is recorded in the recording section 59.

[Imaging process performed by imaging apparatus]

An imaging process performed by the imaging apparatus 11 will next be described with reference to the flowchart in FIG. 4.

For example, when the user turns on the imaging apparatus 11 and operates it to select the imaging mode, the imaging apparatus 11 operates in the imaging mode, which allows the user to capture an image. In step S11, the imaging control section 54 controls the imaging section 51 to display through images, which are images captured in realtime, on the display section 57.

Specifically, the imaging control section 54 instructs the distance measuring image sensor 51*b* to perform pixel value addition or thinning reading to produce an image signal carrying a display image, for example, having a VGA (video graphics array) size (hereinafter simply referred to as a display image) and supplies the image signal to the display control section 56. The display control section 56 displays the display image from the imaging control section 54 as a through image on the display section 57. In this way, the user can look at through images displayed in realtime on the display section 57 and determine the composition of an image to be captured.

In step S12, the input control section 53 judges whether or not the user has performed shuttering operation, that is, the user has pressed the input section 52 that works as a shutter button.

When the judgment in step S12 shows that no shuttering operation has been performed, the control returns to step S11, and the processes in steps S11 and S12 are repeatedly carried out until shuttering operation is performed.

On the other hand, the judgment in step S12 shows that shuttering operation has been performed, the input control section 53 issues an instruction corresponding to an operation signal representing the shuttering operation performed through the input section 52 to the imaging control section 54 and the distance information acquiring section 55, and the control proceeds to step S13.

In step S13, the imaging control section 54 performs an imaging process in accordance with the instruction from the input control section 53. Specifically, at the time when the input control section 53 issues the instruction to the imaging control section 54, the imaging control section 54 reads all pixel values from the distance measuring image sensor 51*b* to produce an image signal carrying a captured image, for example, having a full HD (full high definition) size (hereinafter simply referred to as a captured image) and supplies the captured image to the recording control section 58.

In step S14, the distance information acquiring section 55 acquires distance information from the distance measuring image sensor 51*b* at the time when the input control section 53 issues the instruction to the distance information acquiring section 55 and supplies the distance information to the recording control section 58.

The processes in steps S13 and S14 may be carried out concurrently.

In step S15, the recording control section 58 relates the captured image from the imaging control section 54 to the distance information from the distance information acquiring section 55 on the basis of pixels in the distance measuring image sensor 51*b* and records the captured image and the distance information related to each other in the recording section 59.

As described with reference to FIG. 2, four adjacent pixels in the distance measuring image sensor 51*b* (distance measuring image sensor 32) are formed of three RGB pixels that as a whole output an image signal and one distance measurement pixel. Now, the four adjacent pixels are considered as a block. An image signal carrying a captured image (hereinafter referred to as image information) and distance information are produced for each block. In other words, image information and distance information for each block in a captured image are related to each other by using coordinates representing the position of the block in the captured image.

In the previous section, image information and distance information for each block are separate from each other and related to each other by using the coordinates of the block. Alternatively, distance information may be contained in image information for each block.

Further, in the previous section, four adjacent pixels form a single block. One block only needs to contain at least one distance measurement pixel, for example, 4×4=16 adjacent pixels may form a single block.

In step S16, the input control section 53 judges whether or not the user performs pressing operation on the input section 52 that works as a mode switching button, a power on/off button, or other buttons (not shown), to issue an instruction to terminate the imaging mode.

When the judgment in step S16 shows that no instruction to terminate the imaging mode has been issued, the control returns to step S11 and the processes in steps S11 to S16 are repeatedly carried out.

On the other hand, when the judgment in step S16 shows that an instruction to terminate the imaging mode has been issued, the imaging process is terminated.

By carrying out the processes described above, the imaging apparatus 11 can record a captured image having a composition that the user desires in response to user's shuttering operation. Since the lens 51*a* (lens 31*a*) is a single focal length lens that brings a subject at a remote position or at infinity into focus, the resultant captured image contains a remote subject brought into focus. The captured image can be an excellent scenic image containing remote scenery or any other remote subject.

The processes described above, however, typically cannot produce a focused image of a subject near the imaging apparatus 11, or subjects near the imaging apparatus 11 are all blurred in a captured image.

A description will next be made of a blur correcting process of correcting a blurred subject selected by the user in a captured image recorded in the recording section 59.

[Blur correction performed by imaging apparatus]

Figure 5:
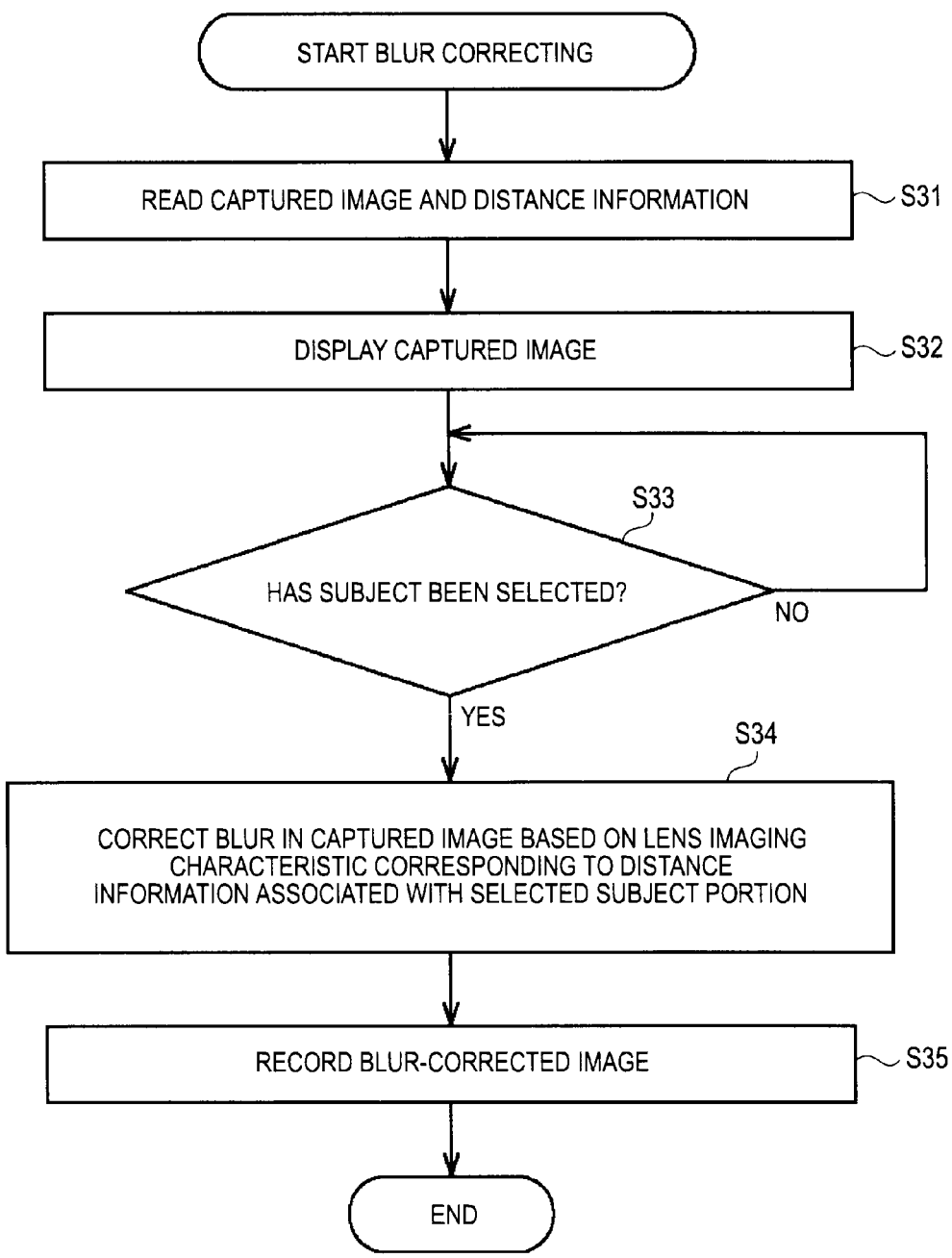
FIG. 5 is a flowchart describing a blur correcting process.

FIG. 5 is a flowchart describing blur correction performed by the imaging apparatus 11.

For example, when the user operates the operation unit to select the image viewing mode, the imaging apparatus 11 operates in the image viewing mode, which allows the user to view a recorded captured image, and display section 57 displays a list of thumbnail images corresponding to captured images recorded in the recording section 59. The thumbnail images are accompanied by icons representing whether or not they have undergone blur correction. When the user operates the operation unit to select a thumbnail image that has undergone no blur correction from the thumbnail image list, blur correction is initiated.

In step S31, the recording control section 58 reads from the recording section 59, among the captured images recorded in the recording section 59, a captured image corresponding to the thumbnail image selected by the user and distance information related to the captured image. Of the thus read captured image and distance information, the recording control section 58 supplies the captured image to the display control section 56 and supplies both the captured image and the distance information to the blur correcting section 60.

In step S32, the display control section 56 displays the captured image from the recording control section 58 on the display section 57. Since the captured image from the recording control section 58 has the full HD size as described above, the display control section 56 converts the captured image from the recording control section 58 in terms of resolution into a VGA-sized image that can be displayed on the display section 57 and displays the converted image on the display section 57.

In step S33, the input control section 53 judges whether or not the user has selected a predetermined subject in the resolution-converted captured image displayed on the display section 57 (hereinafter referred to as a display captured image) based on an operation signal from the input section 52 that works as the touch panel laminated on the monitor 38.

The judgment in step S33 shows that no subject in the display captured image has been selected, the process in step S33 is repeatedly carried out until the input control section 53 judges that a predetermined subject in the display captured image is selected.

On the other hand, when the judgment in step S33 shows that a subject in the display captured image has been selected, the input control section 53 supplies coordinate information on coordinates on the captured image to the blur correcting section 60. The coordinate information is contained in the operation signal from the input section 52 that works as the touch panel, and the coordinates represent an area (block) corresponding to a subject portion selected by the user in the display captured image.

In step S34, the blur correcting section 60 corrects blur in the captured image from the recording control section 58 based on the imaging characteristic of the lens 51a that corresponds to the distance information from the recording control section 58 that corresponds to the coordinates represented by the coordinate information from the input control section 53, that is, the distance information associated with the subject portion selected by the user.

In general, the distribution of blur of a subject contained in a captured image and having a predetermined subject distance is modeled by using a point intensity distribution (point spread function: PSF) that depends on the characteristics of the lens 51a and the subject distance.

The blur correcting section 60 performs blur correction by performing deconvolution on the captured image. The deconvolution is performed by using a PSF according to the distance information (subject distance) associated with the area in the captured image that corresponds to the area in the display captured image that has been touched (selected) by the user on the display section 57 (the area in the captured image is hereinafter referred to as a selected area). The blur correcting section 60 supplies the blur-corrected captured image to the recording control section 58.

In a full HD-sized captured image, for example, a selected area may correspond to one block described above or may be an area formed of several blocks. When a selected area is formed of several blocks, distance information, on which a PSF depends, may be associated with a substantially central one of the several blocks or the average of the distance information associated with the several blocks.

Since the distance to the subject selected in a captured image (subject the user wants to bring into focus) is known in advance in the form of distance information as described above, the blur correcting section 60 can perform blur correction without having to perform deconvolution on the captured image by using a PSF specific to every possible subject distance.

In step S35, the recording control section 58 records the blur-corrected captured image from the blur correcting section 60 in the recording section 59.

In the processes described above, a predetermined subject is selected in a captured image related to distance information on subject distance, and blur correction is performed on the captured image based on the lens imaging characteristic corresponding to the distance information associated with a selected subject portion. That is, since the distance to the subject (subject the user wants to bring into focus) selected in the captured image is known in advance in the form of distance information, the imaging apparatus can perform blur correction without having to perform deconvolution on the captured image by using a PSF specific to every possible subject distance. As a result, the imaging apparatus can produce a focused image with a reduced amount of computation without performing autofocusing or otherwise bringing the subject into focus.

In the above description, when performing blur correction on a captured image, the blur correcting section uses a PSF (point spread function) as the imaging characteristic of the lens 51a corresponding to distance information. Alternatively, the imaging characteristic of the lens 51a may be a line spread function (LSF) or an optical transfer function (OTF) obtained by performing two-dimensional Fourier transform on a point spread function. The OTF is a function representing the degree of degradation of an image in the spatial frequency domain.

Still alternatively, a captured image provided by carrying out the imaging process described with reference to the flowchart in FIG. 4 may be supplied to an image processing apparatus, such as a personal computer, via a recording medium or any other suitable medium (not shown), and the blur correction described above may be performed in the image processing apparatus. In this case, the image processing apparatus does not include the imaging section 51, the imaging control section 54, and the distance information acquiring section 55 in the imaging apparatus 11 shown in FIG. 1. In the blur correction performed by the thus configured image processing apparatus, a display captured image displayed on the display section 57 may remain a full HD-sized image, and the subject selection may be performed, for example, by user's mouse clicking operation instead of touching operation on the touch panel.

Further, in the above description, when the imaging mode is switched to the image viewing mode in the imaging apparatus 11, the blur correction is performed when the user selects a captured image that has undergone no blur correction from a thumbnail captured image list. Alternatively, the blur correction may be automatically performed when the imaging mode is switched to other modes including the image viewing mode.

[Another example of imaging process performed by imaging apparatus]

A description will next be made of an imaging process in which the blur correction is automatically performed after the imaging mode is terminated with reference to FIG. 6.

Figure 4:
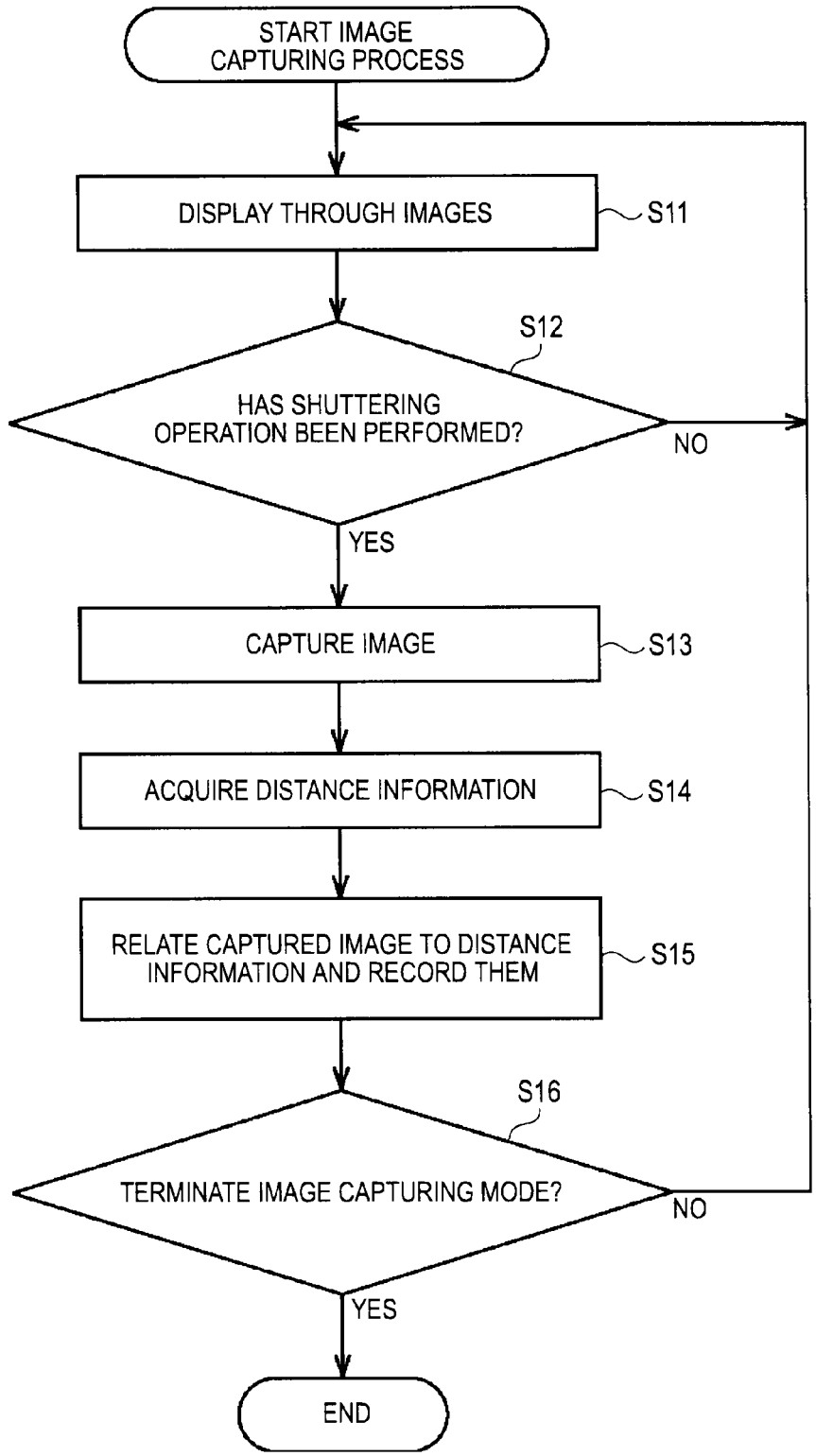
FIG. 4 is a flowchart describing an imaging process.
Figure 6:
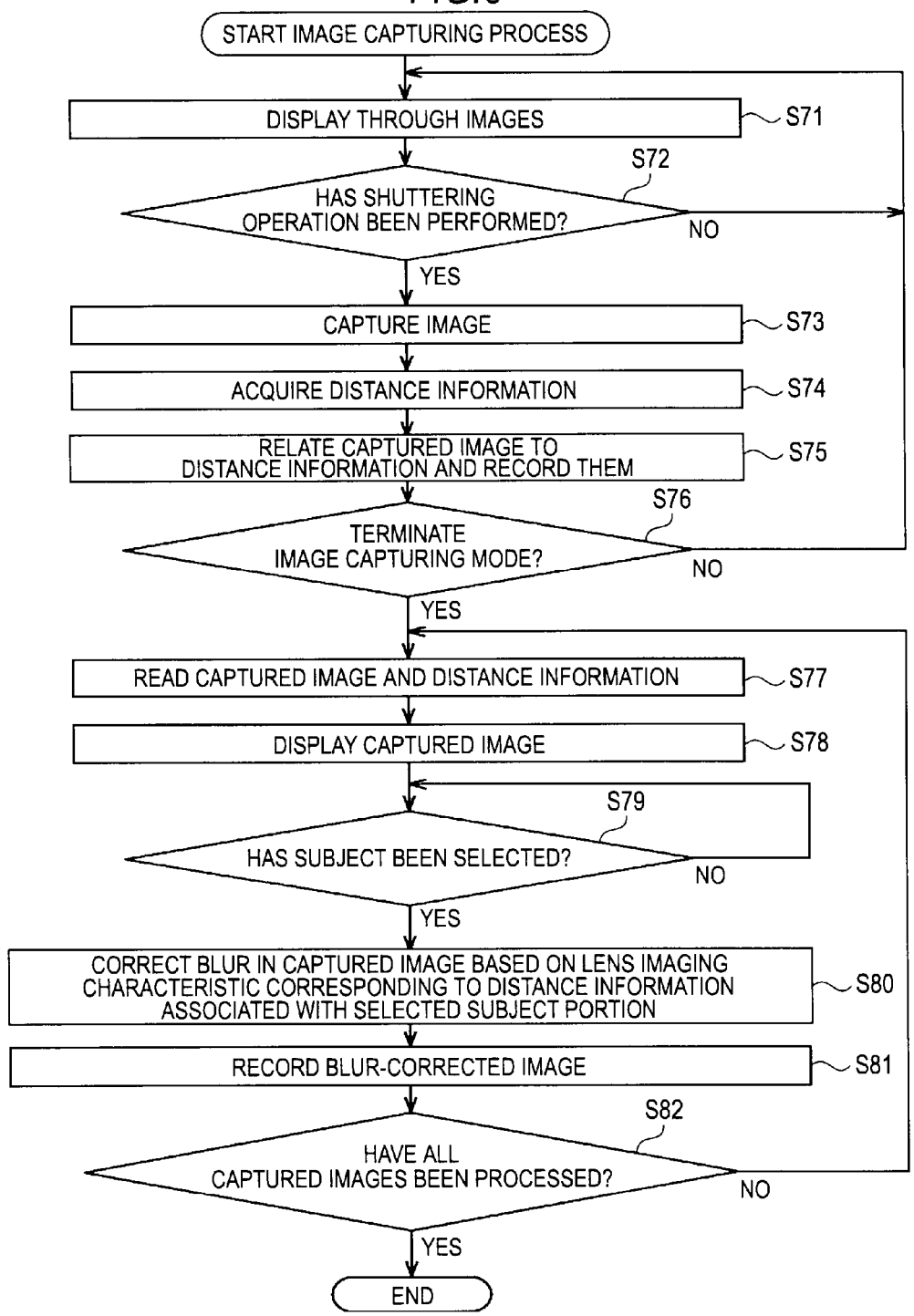
FIG. 6 is a flowchart describing another example of the imaging process.

The processes in steps S71 to S76 in the flowchart in FIG. 6 are basically the same as those in steps S11 to S16 in the flowchart in FIG. 4, and the processes in steps S78 to S81 in the flowchart in FIG. 6 are basically the same as those in steps S32 to S35 in the flowchart in FIG. 5. No description of the steps in FIG. 6 described above will therefore be made.

That is, in the processes in steps S71 to S75, a captured image and distance information are related to each other and recorded, and in step S76, it is judged whether or not the user performs pressing operation on the input section 52 that works as the mode switching button (not shown) and an instruction to terminate the imaging mode has been issued.

When the judgment in step S76 shows that an instruction to terminate the imaging mode has been issued, the control proceeds to step S77.

In step S77, the recording control section 58 reads from the recording section 59, among the captured images captured and recorded in the recording section 59 in the processes in steps S71 to S75, a captured image having been recorded (captured) earliest along the temporal axis and distance information related to the captured image. Of the thus read captured image and distance information, the recording control section 58 supplies the captured image to the display control section 56 and supplies both the captured image and the distance information to the blur correcting section 60.

After a blur-corrected captured image is recorded in the recording section 59 in the processes in steps S78 to S81, the recording control section 58 judges in step S82 whether or not the blur correction has been performed on all the captured images captured and recorded in the processes in steps S71 to S75.

When the judgment in step S82 shows that all the captured images have not been processed, the control returns to step S77, and the processes in step S77 and the following steps are repeatedly carried out on the remaining captured images in descending order of captured time.

On the other hand, when the judgment in step S82 shows that all the captured images have been processed, the imaging process is terminated.

In the processes described above, a predetermined subject is selected in a captured image related to distance information on subject distance, and blur in the captured image is corrected based on the lens imaging characteristic corresponding to the distance information associated with a selected subject portion. That is, since the distance to the subject (subject the user wants to bring into focus) selected in the captured image is known in advance in the form of distance information, the imaging apparatus can perform blur correction without having to perform deconvolution on the captured image by using a PSF specific to every possible subject distance. As a result, the imaging apparatus can produce a focused image with a reduced amount of computation without performing autofocusing or otherwise bringing the subject into focus.

The above description has been made with reference to the configuration in which the user selects a subject that the user wants to bring into focus in a captured image having already obtained. Alternatively, the user may select a subject that the user wants to bring into focus in a through image before capturing an image.

<2. Second Embodiment>

[Exemplary functional configuration of imaging apparatus]

Figure 7:
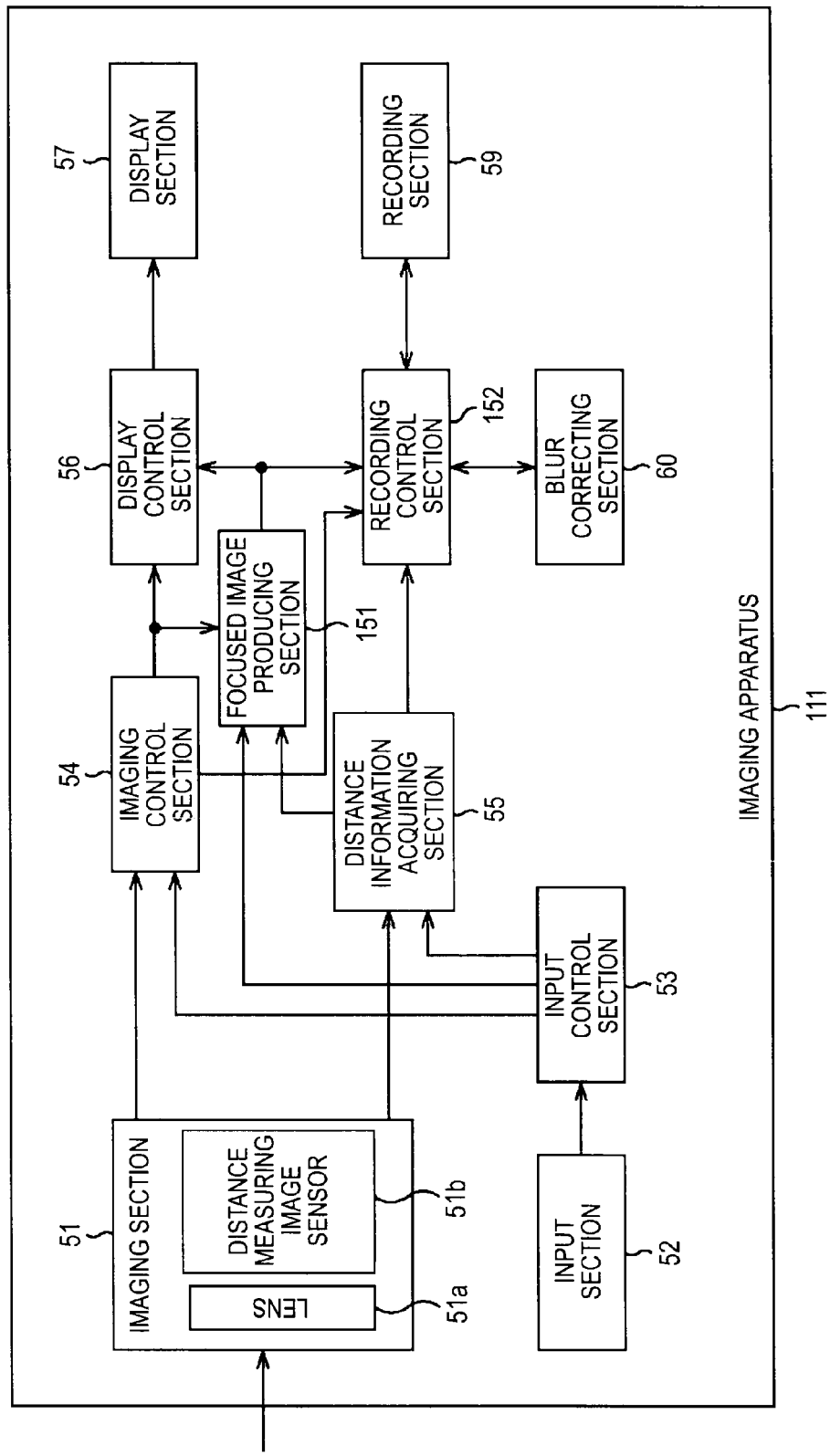
FIG. 7 is a block diagram showing another exemplary functional configuration of the imaging apparatus.

FIG. 7 shows an exemplary functional configuration of an imaging apparatus so configured that the user selects a subject that the user wants to bring into focus in a through image before capturing an image.

An imaging apparatus 111 includes an imaging section 51, an input section 52, an input control section 53, an imaging control section 54, a distance information acquiring section 55, a display control section 56, a display section 57, a recording section 59, a blur correcting section 60, a focused image producing section 151, and a recording control section 152.

In the imaging apparatus 111 shown in FIG. 7, the components having the same functions as those of the components provided in the imaging apparatus 11 shown in FIG. 3 have the same names and reference characters, and no description of these components will be made as appropriate.

That is, the imaging apparatus 111 shown in FIG. 7 differs from the imaging apparatus 11 shown in FIG. 3 in that the focused image producing section 151 is newly provided and the recording control section 58 is replaced with the recording control section 152.

The focused image producing section 151 produces a display focused image in accordance with an instruction from the input control section 53 based on a display image from the imaging control section 54 and distance information from the distance information acquiring section 55. The display focused image is so produced that a subject selected by the user in the display image is brought into focus . The focused image producing section 151 then supplies the display focused image to the display control section 56 and the recording control section 152.

The recording control section 152 not only relates the image signal from the imaging control section 54 to the distance information from the distance information acquiring section 55 on the basis of pixels in the distance measuring image sensor 51b but also relates the display focused image to the image signal and the distance information and records the image signal, the distance information, and the display focused image related to one another in the recording section 59. The recording control section 152 reads the image signal, the distance information, and the display focused image recorded in the recording section 59 as necessary and supplies them to the display control section 56 and the blur correcting section 60.

[Imaging process performed by imaging apparatus]

Figure 8:
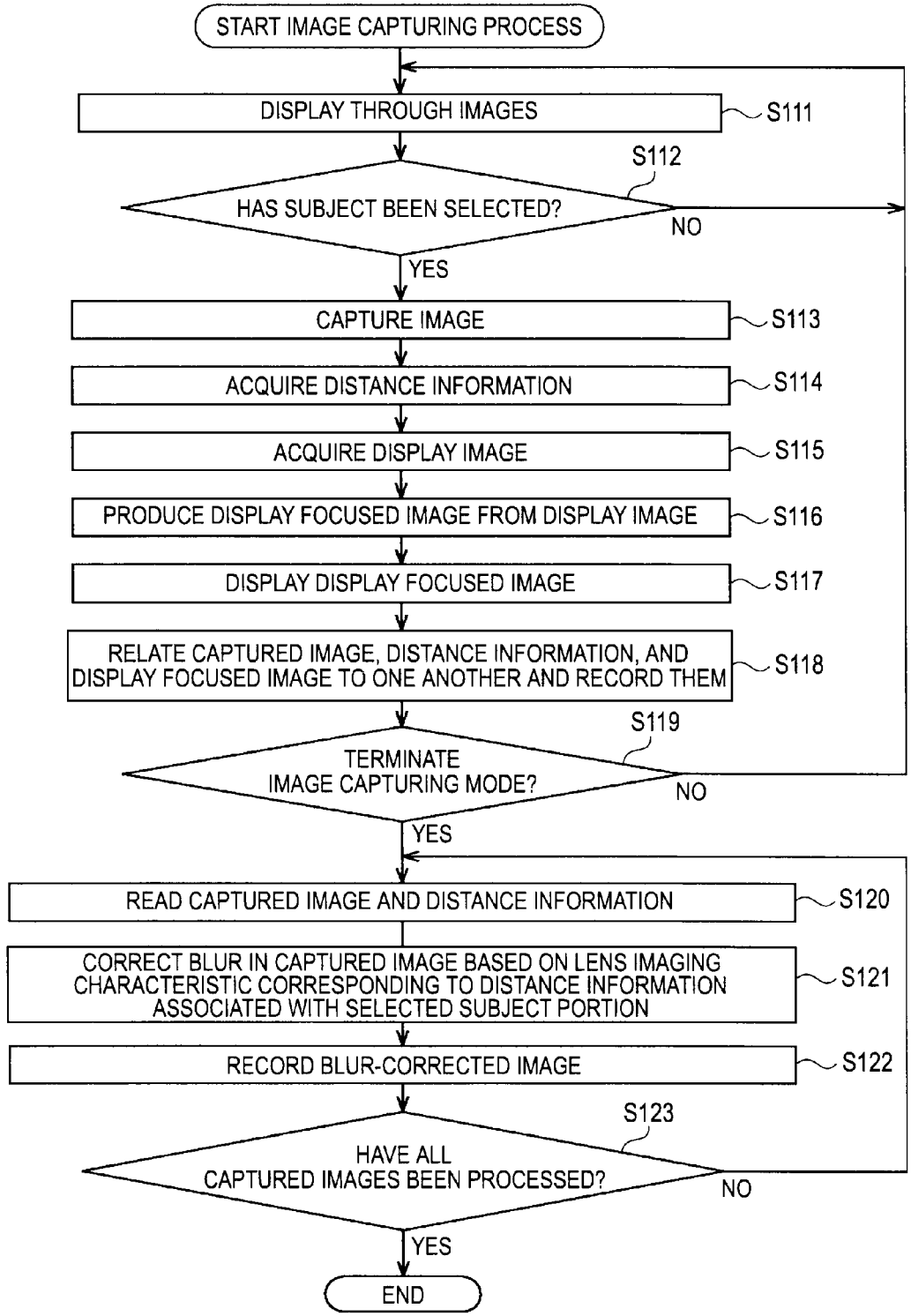
FIG. 8 is a flowchart describing an imaging process performed by the imaging apparatus shown in FIG. 7.

An imaging process performed by the imaging apparatus 111 will next be described with reference to the flowchart in FIG. 8.

For example, when the user turns on the imaging apparatus 111 and operates it to select the imaging mode, the imaging apparatus 111 operates in the imaging mode, which allows the user to capture an image. In step S111, the imaging control section 54 controls the imaging section 51 to display through images, which are images captured in realtime, on the display section 57.

Specifically, the imaging control section 54 instructs the distance measuring image sensor 51b to perform pixel value addition or thinning reading to produce a display image, for example, having the VGA size and supplies the display image to the display control section 56. The display control section 56 displays the display image from the imaging control section 54 as a through image on the display section 57.

In step S112, the input control section 53 judges whether or not the user has selected a predetermined subject in the display image displayed on the display section 57 based on an operation signal from the input section 52 that works as the touch panel laminated on the monitor 38.

When the judgment in step S112 shows that no subject in the display image has been selected, the processes in steps S111 and S112 are repeatedly carried out until the input control section 53 judges that a predetermined subject in the display image is selected.

On the other hand, when the judgment in step S112 shows that a subject in the display image has been selected, the input control section 53 issues an instruction corresponding to the operation signal representing the subject selection operation from the input section 52 that works as the touch panel to the imaging control section 54 and the distance information acquiring section 55. The input control section 53 further supplies the focused image producing section 151 with coordinate information contained in the operation signal and representing the coordinates of the subject portion selected by the user on the display image.

In step S113, the imaging control section 54 performs an imaging process in accordance with the instruction from the input control section 53. Specifically, the imaging control section 54 not only produces the display image as described above but also at the time when the input control section 53 issues the instruction to the imaging control section 54, reads all pixel values from the distance measuring image sensor 51b to produce a captured image, for example, having the full HD size, and supplies the captured image to the recording control section 152.

In step S114, the distance information acquiring section 55 acquires distance information from the distance measuring image sensor 51b at the time when the input control section 53 issues the instruction to the distance information acquiring section 55 and supplies the distance information to the focused image producing section 151 and the recording control section 152.

In step S115, the focused image producing section 151 acquires the display image produced by the imaging control section 54 at the time when the input control section 53 supplies the coordinate information to the focused image producing section 151.

In step S116, based on the coordinate information from the input control section 53 and the distance information from the distance information acquiring section 55, the focused image producing section 151 uses the display image acquired from the imaging control section 54 to produce a display focused image in which the subject portion selected by the user in the display image is brought into focus.

Specifically, the focused image producing section 151 performs blur correction by performing deconvolution on the display image. The deconvolution is performed by using a PSF according to the distance information (subject distance) associated with the selected area in the captured image that corresponds to the area in the display image that has been touched (selected) by the user on the display section 57. The focused image producing section 151 supplies the display focused image, which is the blur-corrected display image, to the display control section 56 and the recording control section 152. It is noted that the coordinate information representing the area touched by the user (subject portion) is added to the display focused image.

In step S117, the display control section 56 displays the display focused image from the focused image producing section 151 on the display section 57.

The processes in steps S113 and S114 and the processes in steps S115 to S117 may be carried out concurrently.

In step S118, the recording control section 152 relates the captured image from the imaging control section 54, the distance information from the distance information acquiring section 55, and the display focused image from the focused image producing section 151 to one another on the basis of pixels in the distance measuring image sensor 51b and records the captured image, the distance information, and the display focused image related to one another in the recording section 59.

It is noted that since the display focused image has been produced by instructing the distance measuring image sensor 51b (distance measuring image sensor 32) to perform pixel value addition or thinning reading, a single pixel in the display focused image is related to a predetermined number of blocks (predetermined number of pixels) in the captured image produced by reading all pixel values from the distance measuring image sensor 51b (distance measuring image sensor 32).

In step S119, the input control section 53 judges whether or not the user performs pressing operation on the input section 52 that works as the mode switching button (not shown) to issue an instruction to terminate the imaging mode.

When the judgment in step S119 shows that no instruction to terminate the imaging mode has been issued, the control returns to step S111 and the processes in steps S111 to S119 are repeatedly carried out.

On the other hand, when the judgment in step S119 shows that an instruction to terminate the imaging mode has been issued, the control proceeds to step S120.

In step S120, the recording control section 152 reads from the recording section 59, among the captured images captured and recorded in the recording section 59 in the processes in steps S111 to S118, a captured image having been recorded (captured) earliest along the temporal axis and distance information and a display focused image related to the captured image. The recording control section 152 supplies the thus read captured image, distance information, and display focused image to the blur correcting section 60.

In step S121, the blur correcting section 60 corrects blur in the captured image from the recording control section 152 based on the imaging characteristic of the lens 51a that corresponds to the distance information from the recording control section 152, which corresponds to the coordinates represented by the coordinate information added to the display focused image from the recording control section 152, that is, the distance information associated with the subject portion selected by the user.

Specifically, the blur correcting section 60 performs blur correction by performing deconvolution on the captured image. The deconvolution is performed by using a PSF according to the distance information (subject distance) associated with the selected area in the captured image that corresponds to the area in the display focused image that is represented by the coordinate information added to the display focused image. The blur correcting section 60 supplies the blur-corrected captured image to the recording control section 152.

Since the distance to a subject selected in a display image (subject that the user wants to bring into focus) is known in advance in the form of distance information as described above, the blur correcting section 60 can perform blur correction without having to perform deconvolution on the captured image by using a PSF specific to every possible subject distance.

In step S122, the recording control section 152 records the blur-corrected captured image from the blur correcting section 60 in the recording section 59.

In step S123, the recording control section 152 judges whether or not the blur correction has been performed on all the captured images captured and recorded in the processes in steps S111 to S118.

When the judgment in step S123 shows that all the captured images have not been processed, the control returns to step S120, and the processes in the step S210 and the following steps are repeatedly carried out on the remaining captured images in descending order of captured time.

On the other hand, when the judgment in step S123 shows that all the captured images have been processed, the imaging process is terminated.

In the processes described above, when a predetermined subject is selected in a display image (through image), a captured image related to distance information on the distance to the subject is acquired (captured), and blur in the captured image is corrected based on the lens imaging characteristic corresponding to the distance information associated with the area in the captured image that corresponds to the subject portion selected in the display image. That is, since the distance to the subject (subject the user wants to bring into focus) selected in the display image is known in advance in the form of distance information, the imaging apparatus can perform blur correction without having to perform deconvolution on the captured image by using a PSF specific to every possible subject distance. As a result, the imaging apparatus can produce a focused image with a reduced amount of computation without performing autofocusing or otherwise bringing the subject into focus.

Further, when a subject is selected in a display image, blur correction is performed on the display image, which has been produced by performing pixel value addition or thinning reading, and the resultant display focused image is displayed. The amount of computation in this process is, however, less than that typically required in a case where blur correction is performed on a captured image produced by reading all pixel values. Moreover, during the imaging mode (steps S111 to S118), no blur correction is performed on a captured image but only the captured image and distance information are recorded in the recording section 59, whereby the imaging process is carried out in realtime and the user can therefore continuously capture images while looking at through images. It is noted that when the imaging apparatus does not carry out high-load processes during the imaging mode, blur correction may be performed on a captured image concurrently with the processes in the imaging mode.

The above description has been made with reference to the configuration in which the user selects a subject in a display image and a captured image containing the subject brought into focus is produced. Alternatively, the imaging control section 54 is provided with face recognition, person recognition, or any other subject recognition function so that a subject in a display image can undergo face recognition or person recognition, and a captured image containing the subject brought into focus can be produced.

Further, the above description has been made with reference to the configuration in which a single focal length lens is used as the lens 51a in the imaging section 51. The following description will be made with reference to a configuration in which a zoom lens is used as the lens in the imaging section 51.

<3. Third Embodiment>
[Exemplary functional configuration of imaging apparatus]

Figure 9:
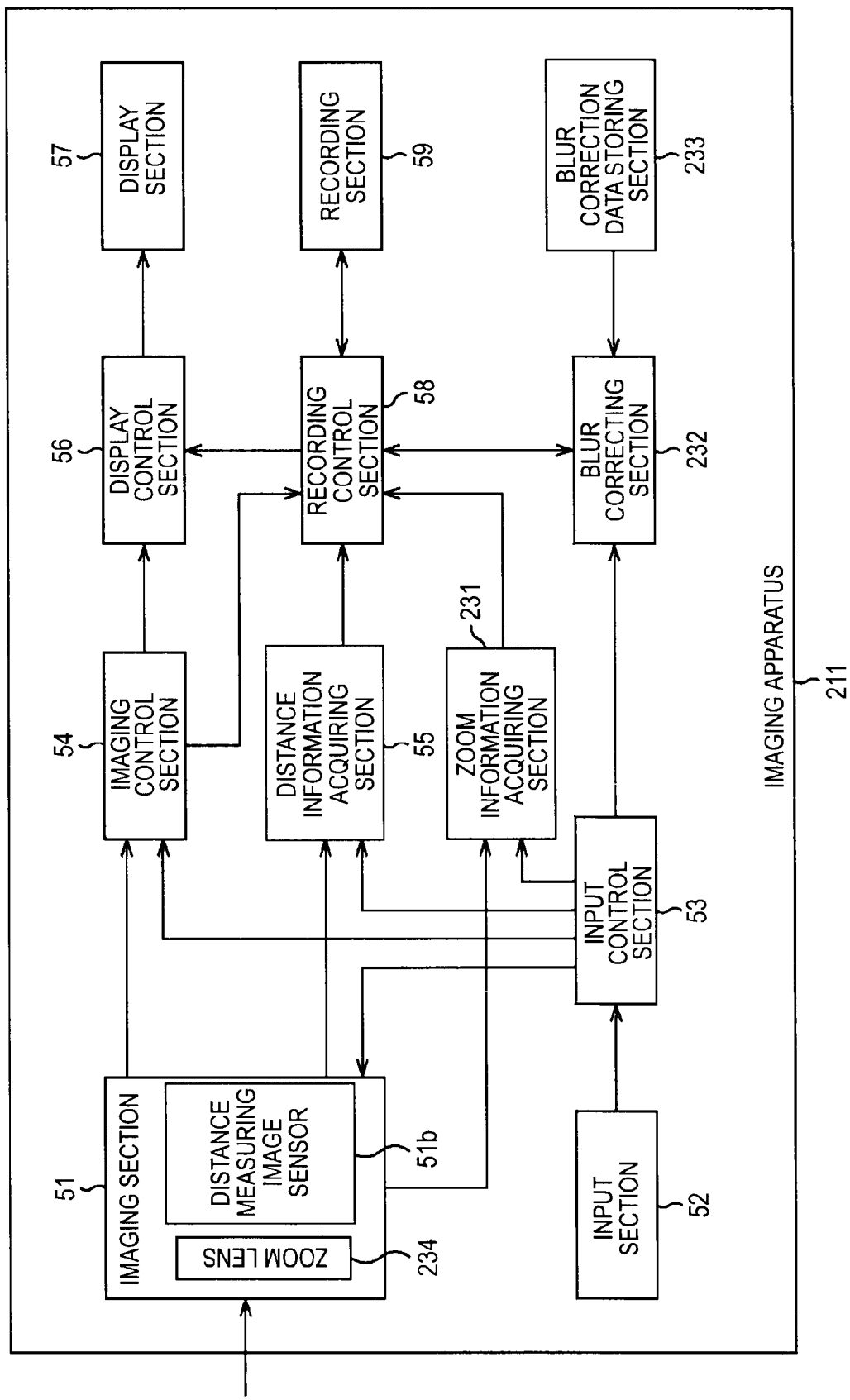
FIG. 9 is a block diagram showing still another exemplary functional configuration of the imaging apparatus.

FIG. 9 shows an exemplary functional configuration of an imaging apparatus using a zoom lens as the lens in the imaging section 51.

An imaging apparatus 211 includes an imaging section 51, an input section 52, an input control section 53, an imaging control section 54, a distance information acquiring section 55, a display control section 56, a display section 57, a recording control section 58, a recording section 59, a zoom information acquiring section 231, a blur correcting section 232, and a blur correction data storing section 233. The imaging section 51 includes a distance measuring image sensor 51b and a zoom lens 234.

In the imaging apparatus 211 shown in FIG. 9, the components having the same functions as those of the components provided in the imaging apparatus 11 shown in FIG. 3 have the same names and reference characters, and no description of these components will be made as appropriate.

That is, the imaging apparatus 211 shown in FIG. 9 differs from the imaging apparatus 11 shown in FIG. 3 in that the zoom information acquiring section 231 and the blur correction data storing section 233 are newly provided and the lens 51a and the blur correcting section 60 are replaced with the zoom lens 234 and the blur correcting section 232.

The zoom information acquiring section 231 acquires from the imaging section 51 zoom information on the zoom magnification of the zoom lens 234 in the imaging section 51 in accordance with an instruction from the input control section 53 and supplies the zoom information to the blur correcting section 232.

The blur correcting section 232 reads blur correction data from the blur correction data storing section 233 in accordance with an instruction from the input control section 53, and the blur correction data corresponds to the zoom information from the zoom information acquiring section 231. The blur correcting section 232 uses the thus read blur correction data to correct blur contained in a captured image from the recording control section 58 and supplies the blur-corrected captured image to the recording control section 58. The blur-corrected captured image supplied to the recording control section 58 is recorded in the recording section 59.

The blur correction data storing section 233 is formed, for example, of a flash memory and stores blur correction data prepared in advance and corresponding to zoom information. The blur correcting section 232 reads as necessary blur correction data stored in the blur correction data storing section 233.

The zoom lens 234 is driven based on an instruction from the input control section 53, and the zoom magnification is determined based on the position of the zoom lens 234. That is, the zoom information acquired by the zoom information acquiring section 231 corresponds to the position of the zoom lens 234.

[Imaging process performed by imaging apparatus]

An imaging process performed by the imaging apparatus 211 will next be described with reference to the flowchart in FIG. 10.

Figure 10:
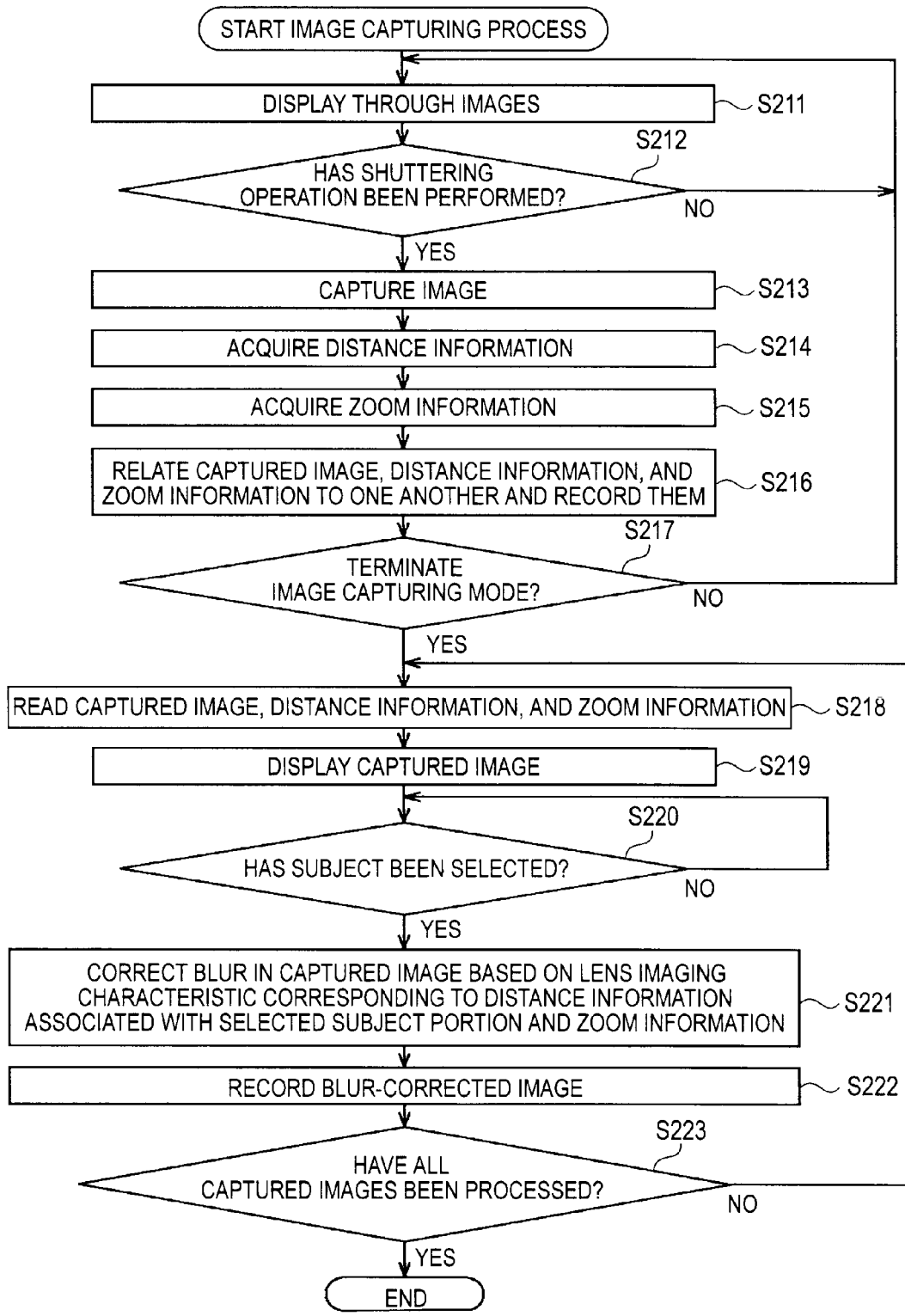
FIG. 10 is a flowchart describing an imaging process performed by the imaging apparatus shown in FIG. 9.

The processes in steps S211 to S214 in the flowchart in FIG. 10 are basically the same as those in steps S71 to S74 in the flowchart in FIG. 6, and no description of the above processes in FIG. 10 will be made.

When judgment in step S212 in FIG. 10 shows that shuttering operation has been performed, the input control section 53 issues an instruction corresponding to an operation signal representing the shuttering operation performed through the input section 52 to the imaging control section 54, the distance information acquiring section 55, and the zoom information acquiring section 231.

In step S215, the zoom information acquiring section 231 acquires zoom information associated with the zoom lens 234 in the imaging section 51 at the time when the input control section 53 issues the instruction to the zoom information acquiring section 231, and the zoom information acquiring section 231 supplies the zoom information to the recording control section 58.

In step S216, the recording control section 58 not only relates a captured image from the imaging control section 54 to distance information from the distance information acquiring section 55 on the basis of pixels in the distance measuring image sensor 51b but also relates the zoom information to the captured image and the distance information and then records the captured image, the distance information, and the zoom information related one another in the recording section 59.

In step S217, the input control section 53 judges whether or not the user performs pressing operation on the input section 52 that works as the mode switching button (not shown) to issue an instruction to terminate the imaging mode.

When the judgment in step S217 shows that no instruction to terminate the imaging mode has been issued, the control returns to step S211 and the processes in steps S211 to S217 are repeatedly carried out.

On the other hand, when the judgment in step S217 shows that an instruction to terminate the imaging mode has been issued, the control proceeds to step S218.

In step S218, the recording control section 58 reads from the recording section 59, among the captured images captured and recorded in the recording section 59 in the processes in steps S211 to S216, a captured image having been recorded earliest along the temporal axis and distance information and zoom information related to the captured image. Among the thus read captured image, distance information, and zoom information, the recording control section 58 supplies the captured image to the display control section 56 and supplies the captured image, the distance information, and the zoom information to the blur correcting section 232.

In step S219, the display control section 56 displays the captured image from the recording control section 58 on the display section 57. Since the captured image from the recording control section 58 has the full HD size as described above, the display control section 56 converts the captured image from the recording control section 58 in terms of resolution into a VGA-sized image that can be displayed on the display section 57 and displays the converted image on the display section 57.

In step S220, the input control section 53 judges whether or not the user has selected a predetermined subject in the resolution-converted display captured image displayed on the display section 57 based on an operation signal from the input section 52 that works as the touch panel laminated on the monitor 38.

The judgment in step S220 shows that no subject in the display captured image has been selected, the process in step S220 is repeatedly carried out until the input control section 53 judges that a predetermined subject in the display captured image is selected.

On the other hand, when the judgment in step S220 shows that a subject in the display captured image has been selected, the input control section 53 supplies coordinate information on coordinates on the captured image to the blur correcting section 232. The coordinate information is contained in the operation signal from the input section 52 that works as the touch panel, and the coordinates represent an area (block) corresponding to a subject portion selected by the user in the display captured image.

In step S221, the blur correcting section 232 corrects blur in the captured image from the recording control section 58 based on the imaging characteristic of the zoom lens 234 that corresponds not only to the distance information from the recording control section 58 that corresponds to the coordinates represented by the coordinate information from the input control section 53, that is, the distance information associated with the subject portion selected by the user, but also to the zoom information from the recording control section 58.

Specifically, the blur correcting section 232 first reads from the blur correction data storing section 233 blur correction data corresponding to the zoom information from the recording control section 58. An example of the blur correction data stored in the blur correction data storing section 233 is specifically data prepared in advance on a PSF (PSF data) of the zoom lens 234 for each predetermined lens position. That is, PSF data corresponding to the position of the zoom lens 234 where the zoom magnification represented by the zoom information is achieved is read in this process.

The PSF data are not necessarily prepared for continuous lens positions (zoom magnifications) but may be prepared for discrete zoom magnifications. If PSF data corresponding to a zoom magnification represented by certain zoom information has not been prepared in the form of blur correction data, the corresponding PSF data can be determined by linear interpolating or otherwise processing the prepared PSF data.

The blur correcting section 232 then performs blur correction by performing deconvolution on the captured image. The deconvolution is performed by using a PSF that is expressed by the PSF data read from the blur correction data storing section 233 and accords with the distance information (subject distance) associated with the selected area in the captured image that corresponds to the area in the display captured image that has been touched (selected) by the user on the display section 57. The blur correcting section 232 supplies the blur-corrected captured image to the recording control section 58.

In step S222, the recording control section 58 records the blur-corrected captured image from the blur correcting section 232 in the recording section 59.

In step S223, the recording control section 58 judges whether or not the blur correction has been performed on all the captured images captured and recorded in the processes in steps S211 to S216.

When the judgment in step S223 shows that all the captured images have not been processed, the control returns to step S218, and the processes in step S218 and the following steps are repeatedly carried out on the remaining captured images in descending order of captured time.

On the other hand, when the judgment in step S223 shows that all the captured images have been processed, the imaging process is terminated.

In the processes described above, a predetermined subject is selected in a captured image related to distance information on subject distance, and blur in the captured image is corrected based on the zoom lens imaging characteristic corresponding not only to the distance information associated with a selected subject portion but also to zoom information associated with the zoom lens. That is, since the distance to the subject (subject the user wants to bring into focus) selected in the captured image is known in advance in the form of distance information and a PSF corresponding to the zoom information (zoom magnification) associated with the zoom lens is prepared in advance, the imaging apparatus can perform blur correction without having to perform deconvolution on the captured image for each of the subject distances by using a PSF specific to every possible subject distance. As a result, the imaging apparatus including the zoom lens can also produce a focused image with a reduced amount of computation without performing autofocusing or otherwise bringing the subject into focus.

In the above description, the distance to a subject is determined in an imaging apparatus including a monocular lens by using the TOF (time of flight) method along with the distance measuring image sensor 51b (distance measuring image sensor 32). The configuration described above is not necessarily used but maybe replaced with any other suitable configuration for determining the distance to a subject.

For example, in an imaging apparatus including right and left lenses (binocular lenses) having their optical axes parallel to each other, a subject is placed on the center line of the imaging apparatus (on the center line between the two optical axes), and the distance to the subject can be determined based on the difference in position of the subject images formed through the two lenses.

Further, the above description has been made with reference to the configuration in which the imaging apparatus is a digital still camera that captures a stationary image. The imaging apparatus may alternatively be, for example, a digital video camcorder that captures video images. In this case, blur correction is performed on an image captured when a subject is selected.

Moreover, the above description has been made with reference to the case where the optical system 31 provided in the imaging apparatus does not need to adjust the position where an image corresponding to subject light incident through the lens 31a is formed. Alternatively, the imaging apparatus may have the following two operation modes: a first mode in which it is unnecessary to adjust the focus position and a second mode in which what is called autofocusing is performed, and the operation mode may be switched between the first and second modes. In this case, the imaging process described above is carried out when the imaging apparatus is operated in the first mode.

The series of processes described above can be carried out by using either hardware or software. When the series of processes is carried out by using software, a program that forms the software is installed from a program recording medium into a computer incorporated in dedicated hardware or, for example, a general-purpose personal computer having a variety of programs installed therein to provide a variety of functions.

Figure 11:
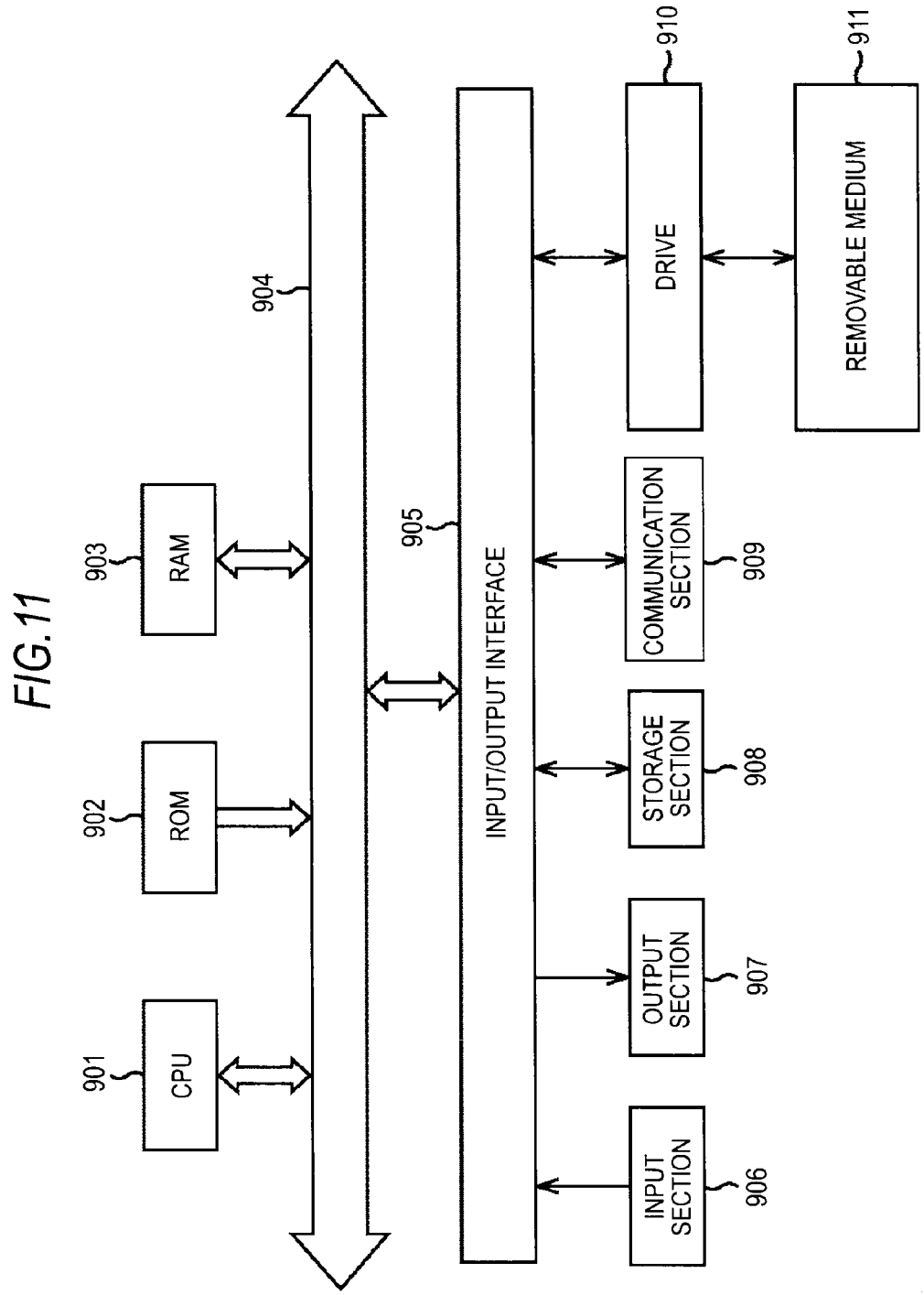
FIG. 11 is a block diagram showing an exemplary configuration of the hardware of a computer.

FIG. 11 is a block diagram showing an exemplary configuration of the hardware of a computer for executing the series of processes described above in the form of a program.

The computer includes a CPU (central processing unit) 901, a ROM (read only memory) 902, and a RAM (random access memory) 903 connected to each other via a bus 904.

An input/output interface 905 is also connected to the bus 904. The following components are connected to the input/output interface 905: an input section 906 formed of a keyboard, a mouse, a microphone, and other devices, an output section 907 formed of a display, a loudspeaker, and other device, a storage section 908 formed of a hard disc drive, a nonvolatile memory, and other devices, a communication section 909 formed of a network interface and other devices, and a drive 910 that drives a removable medium 911, such as a magnetic disk, an optical disk, a magneto-optical disk, and a semiconductor memory.

In the thus configured computer, the CPU 901 loads a program stored, for example, in the storage section 908 into the RAM 903 via the input/output interface 905 and the bus 904 and executes the program to carry out the series of processes described above.

The program to be executed by the computer (CPU 901) can, for example, be recorded on the removable medium 911, which is a package medium formed, for example, of a magnetic disk (including a flexible disk), an optical disk (such as CD-ROM (compact disk-read only memory) and DVD (digital versatile disk)), an magneto-optical disk, and a semiconductor memory. The program can also be provided via a wired or wireless transmission medium, such as a local area network, the Internet, and digital satellite broadcasting.

The program provided in any of the forms described above can be installed in the storage section 908 via the input/output interface 905 by loading the removable medium 911 into the drive 910. The program can alternatively be installed in the storage section 908 by receiving it through the communication section 909 via a wired or wireless transmission medium. Still alternatively, the program can be installed in advance in the ROM 902 or the storage section 908.

The program to be executed by the computer may be a program by which processes are carried out successively in the time sequence described herein or a program by which processes are carried out concurrently or each process is carried out at a necessary timing, for example, when the process is called.

Embodiments of the present disclosure are not limited to those described above, but a variety of changes can be made to the extent that these changes do not depart from the substance of the present disclosure.

The present disclosure contains subject matter related to that disclosed in Japanese Priority Patent Application JP 2010-189302 filed in the Japan Patent Office on Aug. 26, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an optical system that forms an image corresponding to subject light incident through a lens;
   an imaging device that produces a signal corresponding to the subject light incident through the lens and outputs the signal as a captured image; and
   one or more processors being operable to:
      determine a distance from the optical system to a subject being captured in the captured image; and
      correct blur in the captured image based on an imaging characteristic of the optical system specific to the determined distance,
      wherein the determined distance is an average of distance information associated with a plurality of blocks in the captured image corresponding to the subject, wherein each block in the plurality of blocks comprises at least four adjacent pixels.

2. The imaging apparatus according to claim 1, further comprising:
   a display for displaying the captured image, and
   wherein the one or more processors are operable to:
      select the subject in the captured image displayed on the display based on user's operation; and correct blur in the captured image based on the imaging characteristic of the optical system specific to the selected subject.

3. The imaging apparatus according to claim 2,
wherein the display displays through images, which are images captured in real time, produced by instructing the imaging device to perform pixel value addition or thinning reading, and
wherein the one or more processors are operable to:
  select the subject in one of the through images based on the user's operation;
  determine the distance to the subject when the subject in the through image is selected; and
  correct blur in the captured image based on the imaging characteristic of the optical system specific to the subject selected in the through image based on the determined distance.

4. The imaging apparatus according to claim 3,
wherein the one or more processors are operable to produce a focused through image from the through image, the focused through image so produced that the subject selected in the through image is brought into focus,
wherein the display displays the focused through image.

5. The imaging apparatus according to claim 1,
wherein the imaging device outputs part of the signal corresponding to the subject light incident through the lens, the part of the signal used information on the distance to the subject, and
wherein the one or more processors are operable to determine the distance to the subject based on the distance information output from the imaging device.

6. The imaging apparatus according to claim 1, wherein the lens is a single focal length lens that brings an object at infinity or a remote distance into focus.

7. The imaging apparatus according to claim 1,
wherein the lens is a zoom lens, and
wherein the one or more processors are operable to correct the blur in the captured image based on the imaging characteristic of the optical system that is specific to the distance and a zooming state of the zoom lens.

8. The imaging apparatus according to claim 1,
wherein the one or more processors are operable to correct the blur in the captured image based on a point spread function of the optical system specific to the distance to the subject.

9. The imaging apparatus according to claim 1, wherein the one or more processors are operable to correct the blur in the captured image based on a line spread function of the optical system specific to the distance to the subject.

10. The imaging apparatus according to claim 1, wherein the one or more processors are operable to correct the blur in the captured image based on an optical transfer function of the optical system specific to the distance to the subject.

11. An imaging method comprising:
in an imaging device comprising an optical system:
  determining a distance from the optical system to a subject being captured in a captured image; and
  correcting blur in the captured image based on an imaging characteristic of the optical system specific to the determined distance,; and
  wherein the determined distance is an average of distance information associated with a plurality of blocks in the captured image corresponding to the subject, wherein each block in the plurality of blocks comprises at least four adjacent pixels.

12. A non-transitory computer-readable storage medium having stored thereon, a computer program having at least one code section to carry out imaging processing, said at least one code section being executable by a computer for causing said computer to perform steps comprising:
  determining a distance from an optical system to a subject being captured in a captured image; and
  correcting blur in the captured image based on an imaging characteristic of the optical system specific to the determined distance,
  wherein the determined distance is an average of distance information associated with a plurality of blocks in the captured image corresponding to the subject, wherein each block in the plurality of blocks comprises at least four adjacent pixels.

13. The imaging apparatus according to claim 1, wherein the optical system comprises an aperture to control the subject light incident through the lens on a distance measuring image sensor.

14. The imaging apparatus according to claim 1, wherein the imaging device comprises a distance measuring image sensor capable of generating an image signal and a distance signal.

15. The imaging apparatus according to claim 14, wherein the distance measuring image sensor has Bayer layout in which colors red (R), green (G), and blue (B) are so assigned to pixels that G pixels are arranged in a checkerboard pattern, and R pixels and B pixels are disposed between the G pixels.

16. The imaging apparatus according to claim 15, wherein the distance measuring image sensor is so configured that one-half the G pixels arranged in checkerboard pattern are used as pixels for distance measurement.

17. The imaging apparatus according to claim 16, wherein the distance measuring image sensor determines the distance to the subject based on a time period from projection of light to reception.

18. The imaging apparatus according to claim 1, further comprising a recording section to record the signal and the distance information in relation to each other based on coordinates of a block in the captured image, wherein the block comprises the at least four adjacent pixels.

19. The imaging apparatus according to claim 1, wherein the one or more processors are operable to correct the blur in the captured image based on a point spread function corresponding to zoom magnification and the distance.

20. The imaging apparatus according to claim 1, wherein the distance to the subject is determined based on difference in position of subject images formed through a right lens and a left lens.

* * * * *